(12) United States Patent
Stadler

(10) Patent No.: US 9,691,247 B2
(45) Date of Patent: Jun. 27, 2017

(54) FIRE DETECTION APPARATUS, METHOD FOR EVALUATING AT LEAST ONE FIRE DETECTION FEATURE AND COMPUTER PROGRAM

(71) Applicant: Robert Bosch GmbH, Stuttgart (DE)

(72) Inventor: Anton Stadler, Bernau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 305 days.

(21) Appl. No.: 14/472,639

(22) Filed: Aug. 29, 2014

(65) Prior Publication Data

US 2016/0063832 A1    Mar. 3, 2016

(51) Int. Cl.
*H04N 9/47*      (2006.01)
*H04N 7/18*      (2006.01)
*G08B 17/12*     (2006.01)
*G01B 11/00*     (2006.01)

(52) U.S. Cl.
CPC ............ *G08B 17/125* (2013.01); *G01B 11/00* (2013.01)

(58) Field of Classification Search
CPC ....... G08B 17/125; G08B 21/10; G01B 11/00
USPC ....................................................... 348/142
See application file for complete search history.

(56) References Cited

U.S. PATENT DOCUMENTS

| | | | | |
|---|---|---|---|---|
| 5,832,187 A | * | 11/1998 | Pedersen | G06Q 10/06 340/577 |
| 7,688,225 B1 | * | 3/2010 | Haynes | G08G 1/14 340/932.2 |
| 2008/0010871 A1 | * | 1/2008 | Holmes | G06F 1/3203 40/1 |
| 2008/0221741 A1 | * | 9/2008 | Pillar | A62C 27/00 701/1 |
| 2011/0122245 A1 | * | 5/2011 | Sinha | G08B 17/005 348/143 |
| 2013/0094699 A1 | * | 4/2013 | Ko | G06K 9/6282 382/103 |

FOREIGN PATENT DOCUMENTS

JP    4352096    12/1992

* cited by examiner

*Primary Examiner* — Jared Walker
(74) *Attorney, Agent, or Firm* — Michael Best & Friedrich LLP

(57) ABSTRACT

A fire detection apparatus 1 including a wind ascertainment device 6 and an evaluation device 3, and connectable to at least one monitoring camera 2 for recording image data of a monitoring region. The evaluation device 3 includes a control unit 7, configured for evaluation of wind parameters provided by the wind ascertainment device 6. The evaluation device 3 includes an image processing unit 4 configured to evaluate at least one fire detection feature from the image data transmitted from the monitoring camera 2, wherein the control unit 7 switches the image processing unit 4 to different fire detection operation modes in dependence on the wind parameters.

20 Claims, 3 Drawing Sheets

FIRE DETECTION APPARATUS, METHOD FOR EVALUATING AT LEAST ONE FIRE DETECTION FEATURE AND COMPUTER PROGRAM

BACKGROUND OF THE INVENTION

The invention relates to a fire detection apparatus. The invention also relates to a method for fire detection and to a corresponding computer program.

Automatic fire detectors serve for detecting fires and for triggering an alarm in case a fire is detected. To detect the fire, certain characteristic variables, such as temperature or density of smoke particles, are measured. Owing to the availability of cheap image sensors, automatic fire detectors can also be operated with video cameras, wherein the fire is detected via digital image processing.

The document JP 435 20 96 A, which probably represents the closest prior art, describes a wind capturing device with which a wind direction and wind speed can be captured. The wind direction and the wind speed are represented according to the abstract on a screen in real time. A cursor fixes a fire source on the screen and shows depending on the angular inclination the wind direction and speed.

SUMMARY OF THE INVENTION

Proposed within the framework of the invention is a fire detection apparatus, a method and a computer program.

Proposed according to the invention is thus a fire detection apparatus for detecting fires in a monitoring region. The monitoring region can be, for example, spaces or space sections in a building or even outside regions in an environment. The fire detection apparatus can be connected or is connected to at least one monitoring camera, which is configured and/or arrangable for recording image data of the monitoring region with the camera field of vision thereof. The at least one monitoring camera can be configured, for example, as a CCD camera or as a CMOS camera or in another type of structure. It can be realized in particular as a black-and-white camera or as a color camera. By way of example, the monitoring camera is configured to be pivotable and/or inclinable so as to change or expand the monitoring region. The fire detection apparatus optionally comprises the at least one monitoring camera.

The fire detection apparatus comprises a wind ascertainment device for ascertaining wind speeds and/or wind directions within the monitoring region. In particular, the wind ascertainment device is arranged within the monitoring region so as to achieve as precise an ascertainment of the wind speeds and/or wind directions as possible.

The fire detection apparatus comprises an evaluation device. The evaluation device has a control unit, wherein the control unit is suitable and/or configured for evaluation of wind speed data and/or wind direction data formed on the basis of the wind ascertainment device.

The evaluation device comprises an image processing unit. For transmission of the image data, the at least one monitoring camera is connected to the evaluation device, in particular to the image processing unit, by data-technological means. The data transmission of the image data is preferably effected via a network. The network may be a cable-bound network, such as for example a LAN, or a cable-less network, such as for example a WLAN. However, it is also possible for the network or at least for a portion of the transmission link in the network to be configured as a public network, in particular an internet. The image processing unit is based with particular preference on digital image processing. The image processing unit and/or the evaluation device can be configured for example as a digital data processing device, in particular as a computer.

Proposed within the framework of the invention is that the image processing unit is configured for evaluating at least one fire detection feature from the image data transmitted from the at least one monitoring camera. The at least one fire detection feature is in particular a characteristic of a fire or a fire origin. For example, a flame or smoke is evaluated as the fire detection feature. The image processing unit is configured preferably for fire detection within the monitoring region on the basis of the at least one evaluated fire detection feature. In particular, the relative position of the monitoring camera with respect to or within the environment region and/or camera parameters of the monitoring camera are taken into account during the evaluation of the at least one fire detection feature. The camera parameters of the at least one monitoring camera are, for example, the focal length, the aperture angle, the pivot and/or the inclination angle.

Video monitoring of the monitoring region permits, for example in comparison to a simple smoke detector, the evaluation of additional information. For example, outside regions can be monitored or statements regarding type and position of fires can be made.

Furthermore proposed is that the control unit switches the image processing unit to different fire detection operation modes in dependence on the wind speed data and/or wind direction data.

The changing wind conditions can result in a change of the form of the at least one fire detection feature. A static, in particular wind-independent evaluation of the at least one fire detection feature could thus lead to less specific fire detection. As a result, the switching of the image processing unit to different fire detection operation modes effects dynamic matching to the relevant wind conditions. Switching the image processing unit to different fire detection operation modes in dependence on the evaluated wind conditions consequently achieves reliable evaluation of the fire detection features and thus of fire detection.

In one particularly preferred embodiment, the wind ascertainment device has at least one electrical wind measuring device. In particular, the at least one electrical wind measuring device is configured to ascertain the wind speed and/or the wind direction and transmits these as wind speed data and/or wind direction data to the control unit. In particular, the at least one electrical wind measuring device is connected by data-technological means to the control unit for transmitting the wind speed data and/or wind direction data.

The electrical wind measuring device is configured for example as an electrical wind direction transmitter, which is used to ascertain at least the wind direction. The electrical wind direction transmitter aligns itself with the wind direction, as a result of which the wind direction is ascertained. Alternatively or for optional supplementation, the electrical wind measuring device is configured as an anemometer with which at least the wind speed is ascertainable. The anemometer has, for example, semi-spherical shells which run around a vertically oriented rotor axis in dependence on the wind speed, as a result of which the wind speed is ascertained.

Alternatively or in optional supplementation to the electrical wind measuring device, the wind ascertainment device has at least one wind indication module, wherein the wind speed and/or the wind direction are capturable through the capturing of the position state of the wind indication module using the at least one monitoring camera. In particular, the image processing unit captures the position state of the wind indication module from the transmitted image data. The possible position states the wind indication module can have are included, for example, in a logic table, wherein a wind speed and/or wind direction value is associated with each position state in the logic table. By evaluating the position state, the wind speed data and/or the wind direction data are thus ascertainable. Evaluation of the position state and/or the ascertainment of the wind speed and/or wind direction values on the basis of the position state is preferably carried out by the image processing unit. The evaluated wind speed data and/or wind direction data are transmitted in particular to the control unit, whereupon the control unit switches the image processing unit to one of the fire detection operation modes in dependence on the transmitted wind speed data and/or wind direction data.

For example, the wind indication module is configured as a wind vane. Generally known are wind vanes on rooftops, which enable people to read a wind direction by the alignment thereof with the wind direction.

Alternatively or for optional supplementation, the wind indication module is configured as a wind sock. The wind sock is used in particular to enable the ascertainment of the wind speed and/or the wind direction. In order to ascertain the wind speed, for example an internal angle between the wind sock and a rod on which the wind sock is mounted is ascertained. In order to ascertain the wind direction, for example the direction indicated by the wind sock is ascertained.

If the wind direction is ascertained, provision is preferably also made for ascertainment of the wind speed. In the case of calm air, in particular, the wind speed data and wind direction data are correlated in order to discard the last ascertained wind direction. In this way, an evaluation of wind in a wind direction in spite of calm air is ruled out.

With particular preference, the at least one fire detection feature is the movement direction and/or the movement speed of the smoke cloud. In particular, the movement direction and/or the movement speed of the smoke cloud is captured using optical flow. In optical flow, the direction and/or the speed of movements of image sections, which can sometimes be associated with objects or object sections, is/are captured in video sequences. In this case, for each image section, a vector having a movement direction and/or movement speed is determined, such that a vector field with vectors is formed, which vectors describe the movement direction and/or the movement speed of the relevant image section.

In one further preferred embodiment, the at least one fire detection feature is a contour of the smoke cloud. The contour of the smoke cloud has, in dependence on the movement direction and/or movement speed, characteristic curves, and the contour therefore represents a reliable parameter for fire detection. In particular, the image processing unit comprises, for the capturing of the contour, a reference image which is compared to the images recorded by the monitoring camera for evaluation of the contour of the smoke cloud.

In one particularly preferred implementation of the invention, the image processing unit is switched to a fire detection active mode or to a fire detection passive mode as one of the fire detection operation modes. In particular, the image processing unit in the fire detection active mode is enabled for the evaluation of the at least one fire detection feature and disabled in the fire detection passive mode. Fire detection features are not always capturable in particular in the case of wind turbulence. Provision is therefore preferably made for the image processing unit to be switched to the fire detection passive mode in the case where a previously defined threshold value for a specific wind speed or a number of different wind directions within a previously defined time window is exceeded. If the wind speed data and/or wind direction data fall below this previously defined threshold value, the image processing unit is switched in particular to the fire detection active mode. By way of example, the image processing unit is switched to the fire detection passive mode in the case of a wind speed of greater than 15 km/h and/or if the number of different wind directions per time window is more than 2. Two different wind directions occur in particular if the wind directions differ by at least 5° and/or at most 25°.

In one preferred further development, the image processing unit is switched in the fire detection active mode by the control unit to a calm-wind or a wind mode.

The image processing unit is preferably switched to the calm-wind mode if the wind speed falls below a previously defined threshold value. For example, the image processing unit is switched to the calm-wind mode if the wind speed is lower than 10 km/h, in particular lower than 8 km/h. If a wind direction is ascertained here, it is preferably not taken into account.

In the case of the wind mode, preferably a laminar wind flow was evaluated by the control unit. The image processing unit is in particular switched to the wind mode during the evaluation of the laminar wind flow. The laminar wind flow occurs preferably if exactly one wind direction or a limited number of different wind directions within a defined time window are ascertained and/or the ascertained wind speed is within a defined wind speed range. The lower threshold value for the wind speed and/or for the number of different wind directions is formed in particular by the threshold value for the calm-wind mode. The upper threshold value for the wind speed and/or the number of different wind directions is formed in particular by the threshold value for the fire detection passive mode.

According to one particularly preferred embodiment of the invention, the at least or exactly one fire detection feature is the movement direction of a rising smoke cloud. On account of the high temperatures of the fire gases or smoke aerosols in the smoke cloud compared with the environment, the smoke cloud always rises. For example, the rising smoke cloud in the case of calm wind will in particular take the shape of a vertically oriented column. It is therefore preferred for the image processing unit to be adapted in the calm-wind mode to proceed from a vertically oriented column as the rising smoke cloud. The vertically oriented column is assumed to refer in particular to an angle of +/−10° with respect to the vertical. In the evaluation of the column using the optical flow, in particular vectors having a vertical movement direction and/or movement speed should be used as the basis in the calm-wind mode. In the evaluation of the column using contour capturing, in particular a column contour extending vertically upwards should be used as the basis in the calm-wind mode.

In the case of wind in exactly one wind direction, the rising smoke cloud will take in particular the shape of a column which is oriented at an angle to the vertical. Against this background, it is preferred if the image processing unit in the wind mode is adapted to proceed from a column oriented at an angle to the vertical as the rising smoke cloud. The column which extends at an angle to the vertical is assumed to refer in particular to an angle of at least +/−15° and/or at most +/−85° to the vertical. In the evaluation of the column using the optical flow, in the wind mode, in particular vectors with a movement direction and/or movement speed at an angle to the vertical should be taken as the basis. In the evaluation of the column using contour capturing, in the wind mode, a contour extending at an angle to the vertical should in particular be taken as the basis.

At high wind speeds and/or at winds in different wind directions, owing to the transient movement turbulent wind flow occurs. As a result, the rising smoke cloud is in particular swirled, such that no defined shape of the smoke cloud is capturable. It is therefore preferred if the image processing unit is switched to the fire detection passive mode and therefore does not evaluate a rising smoke cloud.

Further preferred fire detection features can, for example, be the movement speed of the smoke cloud or the smoke cloud area. Furthermore, for example the image contrast change, specifically the image contrast reduction in the smoke cloud, and/or the color saturation change, in particular the color saturation reduction, are possible as at least fire detection feature. The image contrast change and the color saturation change are the result in particular of the smoke density of the smoke cloud. As a final exemplary fire detection feature, flames, in particular the propagation direction of the flames or the orientation of the flame tips should be noted, which are dependent on the wind speed and/or wind direction.

The form and consequently the capturability of the fire detection features can vary depending on the wind conditions. One preferred embodiment therefore makes provision for the image processing unit in the different modes of the fire detection active mode, in particular in the calm-wind and wind modes, to be adapted for the evaluation of different or supplementary fire detection features. In this way, in particular the reliability of fire detection is increased.

A further subject matter of the invention relates to a method for evaluating the at least one fire detection feature. The wind ascertainment device ascertains the wind speeds and/or the wind directions in the monitoring region, wherein the control unit evaluates the wind speed data and/or wind direction data formed on the basis of the wind ascertainment device. The image processing unit evaluates the at least one fire detection feature from the image data transmitted by the at least one monitoring camera. The image processing unit detects the fire, in particular using the at least one evaluated fire detection feature in the monitoring region. The control unit switches the image processing unit to different fire detection operation modes in dependence on the wind speed data and/or wind direction data.

A further subject matter of the invention relates to a computer program with program code means according to the invention.

Further features, advantages and effects of the invention result from the following description of preferred exemplary embodiments of the invention and the attached figures, in which:

DETAILED DESCRIPTION

Figure 1:
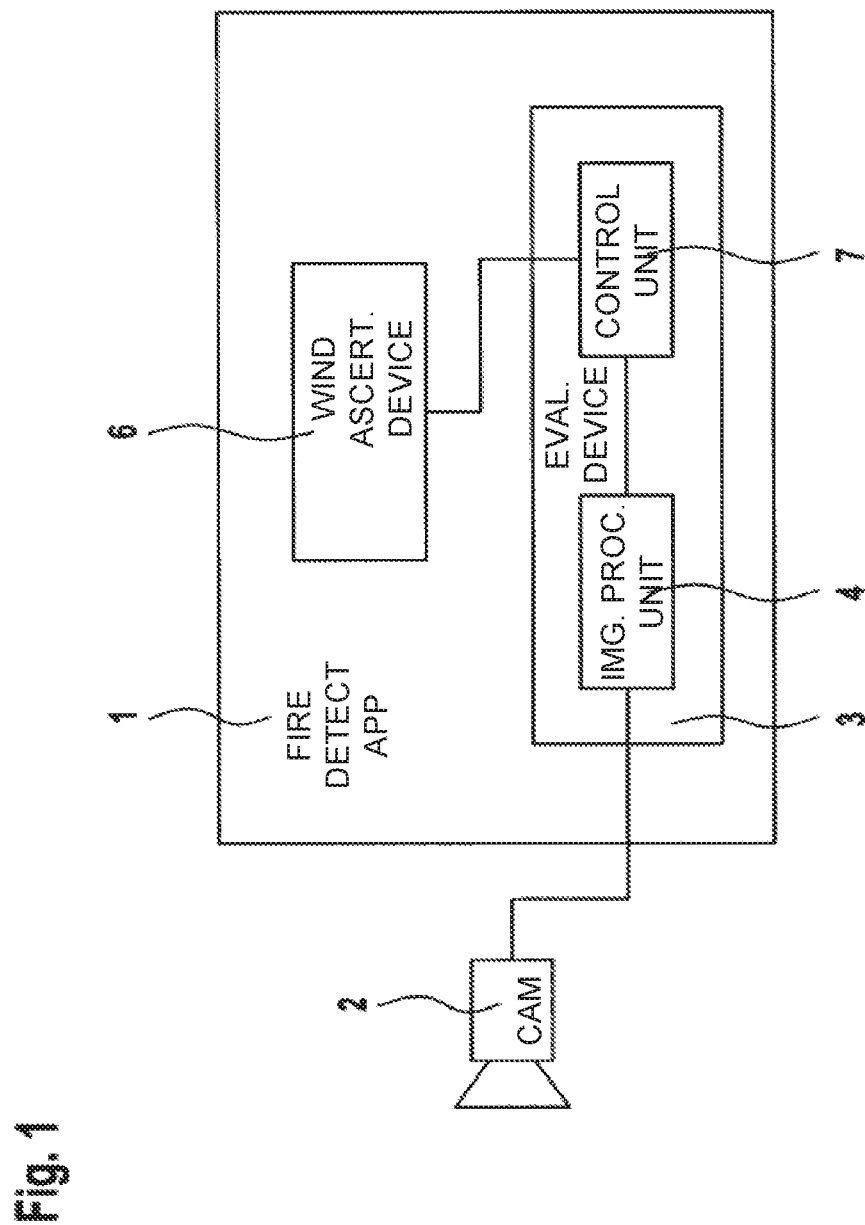
FIG. 1 shows a block diagram of a fire detection apparatus.

FIG. 1 shows a fire detection apparatus 1 in a block diagram. The fire detection apparatus 1 serves for fire detection in a monitoring region, for example closed spaces or outside regions.

The fire detection apparatus 1 is connected to a monitoring camera 2, which is configured in particular as a video monitoring camera. In other exemplary embodiments, a plurality of monitoring cameras 2 are provided, for example for 3-D mapping of the monitoring region or for capturing the monitoring region from different perspectives. The fire detection apparatus 1 optionally comprises the monitoring camera 2. The monitoring camera 2 should be directed with the viewing field thereof to the monitoring region, such that the monitoring region is captured by the monitoring camera.

The fire detection apparatus 1 comprises an evaluation device 3 having an image processing unit 4. The monitoring camera 2 transmits the captured image data of the monitoring region to the image processing unit 4. The image processing unit 4 is configured to evaluate at least one fire detection feature from the transmitted image data. The at least one fire detection feature is, for example, a characteristic variable of the optical flow, which is determined for example using the Horn-Shunck method. Optical flow in digital image processing and optical measurement technology refers to a computed vector field which indicates the movement direction and/or the movement speed for pixels of an image sequence. In the following exemplary embodiments, the at least one fire detection feature is the movement direction of a rising smoke cloud 5 (FIG. 2), which can be evaluated according to the optical flow.

Since, for example, the movement direction of the rising smoke cloud 5 varies depending on the perspective and the orientation of the monitoring camera 5, in particular the relative position of the monitoring camera 5 with respect to or within the environment region and/or the camera parameters of the monitoring camera 2, such as for example the focal length, the aperture angle, the yaw, roll and/or the pitch angle, are taken into account during the evaluation of the smoke cloud 5.

The image processing unit 4 for fire detection is, for example, configured on the basis of the movement direction of the rising smoke cloud 5. The movement direction of the rising smoke cloud 5 is dependent on the wind conditions which can vary strongly especially in outside regions. For example, the rising smoke cloud 5 at calm wind forms in particular the shape of a vertically oriented column, at wind speeds in one wind direction in particular the shape of a column which is oriented at an angle to the vertical, and at winds with different wind directions in particular a swirled shape so that no definable smoke cloud is produced. In order to enable reliable fire detection of the image processing unit 4 despite the multitude of possible movement directions of the smoke cloud 5, the fire detection apparatus 1 comprises a wind ascertainment device 6 which ascertains the wind speeds and/or wind directions in the monitoring region.

The evaluation device 3 comprises a control unit 7, wherein the control unit 7 evaluates the wind speed data and/or wind direction data formed on the basis of the wind ascertainment device 6. The control unit 7 switches the image processing unit 4 to different fire detection operation modes in dependence on the wind speed data and/or wind direction data. Owing to the different fire detection operation modes, the image processing unit 4 can be adapted to the different wind conditions, such that the reliability of the fire detection is improved.

The image processing unit 4 is switched by the control unit 7 to a fire detection active mode or to a fire detection passive mode as one of the fire detection operation modes. In the fire detection active mode, the image processing unit 4 is enabled for evaluation of the at least one fire detection feature and is disabled in the fire detection passive mode. The control unit 7 switches the image processing unit 4 to the corresponding mode in dependence on previously defined threshold values relating to wind speed and/or wind direction. If a specific wind speed and/or a specific number of different wind directions within a time window is exceeded, the control unit 7 evaluates a turbulent wind flow and consequently a swirled smoke cloud, the movement direction of which is unpredictable owing to the random, transient movement of the fluid particles of the smoke cloud. Reliable fire detection is no longer possible on the basis of the smoke cloud 5. As a result, the control unit 7 switches the image processing unit 4 to the fire detection passive mode, since video-based detection of the smoke cloud is no longer possible.

In the fire detection active mode, the control unit 7 distinguishes at least between the calm-wind and wind modes on the basis of the possible movement directions of the smoke cloud 5. In this way, evaluation criteria are adapted to the at least one fire detection feature in dependence on the wind conditions. If a specific wind speed falls under a threshold value, in particular if calm wind prevails, the control unit 7 switches the image processing unit 4 to the calm-wind mode. The image processing unit 4 is adapted in the calm-wind mode to proceed from the vertically oriented column as the rising smoke cloud and, proceeding therefrom, to detect the fire. During the ascertainment of a laminar wind flow, the control unit 7 switches the image processing unit 4 to the wind mode. The image processing unit 4 is adapted in the wind mode to proceed from the column oriented at an angle to the vertical corresponding to the last ascertained wind direction and, on the basis thereof, to detect the fire. The laminar wind flow occurs in particular if the ascertained wind speed lies in a fixed wind speed range and exactly one wind direction or a limited number of different wind directions within a defined time window is ascertained.

Figure 2:
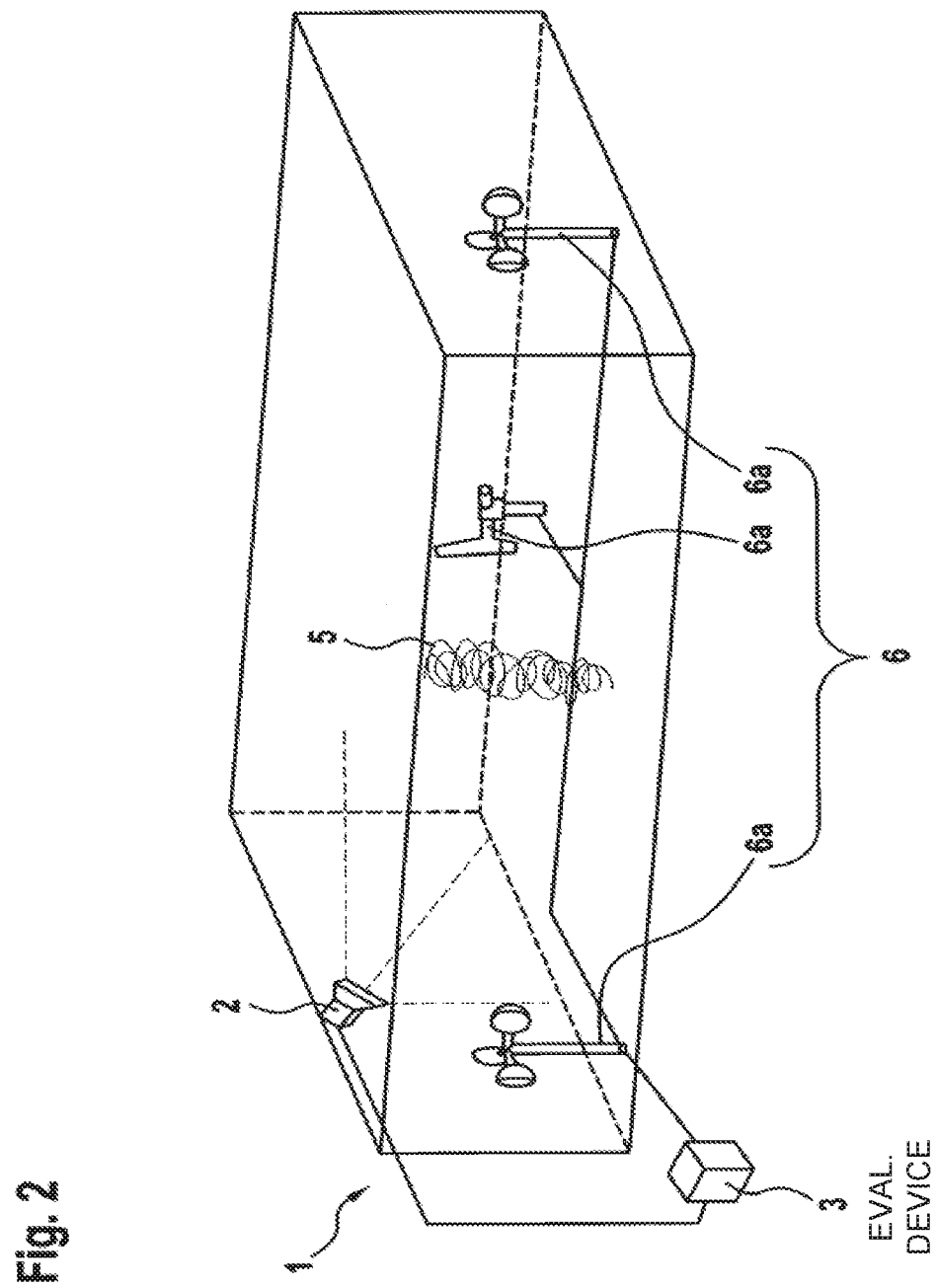
FIG. 2 shows a schematic illustration of the fire detection apparatus from FIG. 1 as a first exemplary embodiment of the invention.

FIG. 2 shows a schematic illustration of the fire detection apparatus 1 as a first exemplary embodiment of the invention. As has already been explained in more detail in FIG. 1, the fire detection apparatus 1 comprises the wind detection device 6, the evaluation unit 3 with the image processing unit 4 and the control unit 7. The monitoring camera 2 is connected to the image processing unit 4 by data-technological means for transmission of the image data. Illustrated purely by way of example is a vertically oriented column as the rising smoke cloud 5 in the monitoring region.

In this exemplary embodiment, the wind detection device 6 comprises three electrical wind measuring devices 6a, which are arranged in the environment region. The number and arrangement of the illustrated electrical wind measuring devices 6a are exemplary and can, for example, vary depending on the size of the environment region. The electrical wind measuring devices 6a are connected to the control unit 7 by data-technological means for transmitting the ascertained wind speed data and/or wind direction data. The electrical wind measuring devices 6a in the illustration are connected to one another and to the control unit 7 by cables, but for example cable connections to the control unit 7 independently of one another or a cable-less connection are also possible.

The electrical wind measuring devices 6a are in this case configured as two anemometers 6a and as an electrical wind direction transmitter 6a. The anemometers 6a ascertain at least the wind speed in the environment region. The electrical wind direction transmitter 6a ascertains at least the wind direction in the environment region. The illustrated electrical wind measuring devices 6a are one possible combination and should not be considered as limiting.

Figure 3:
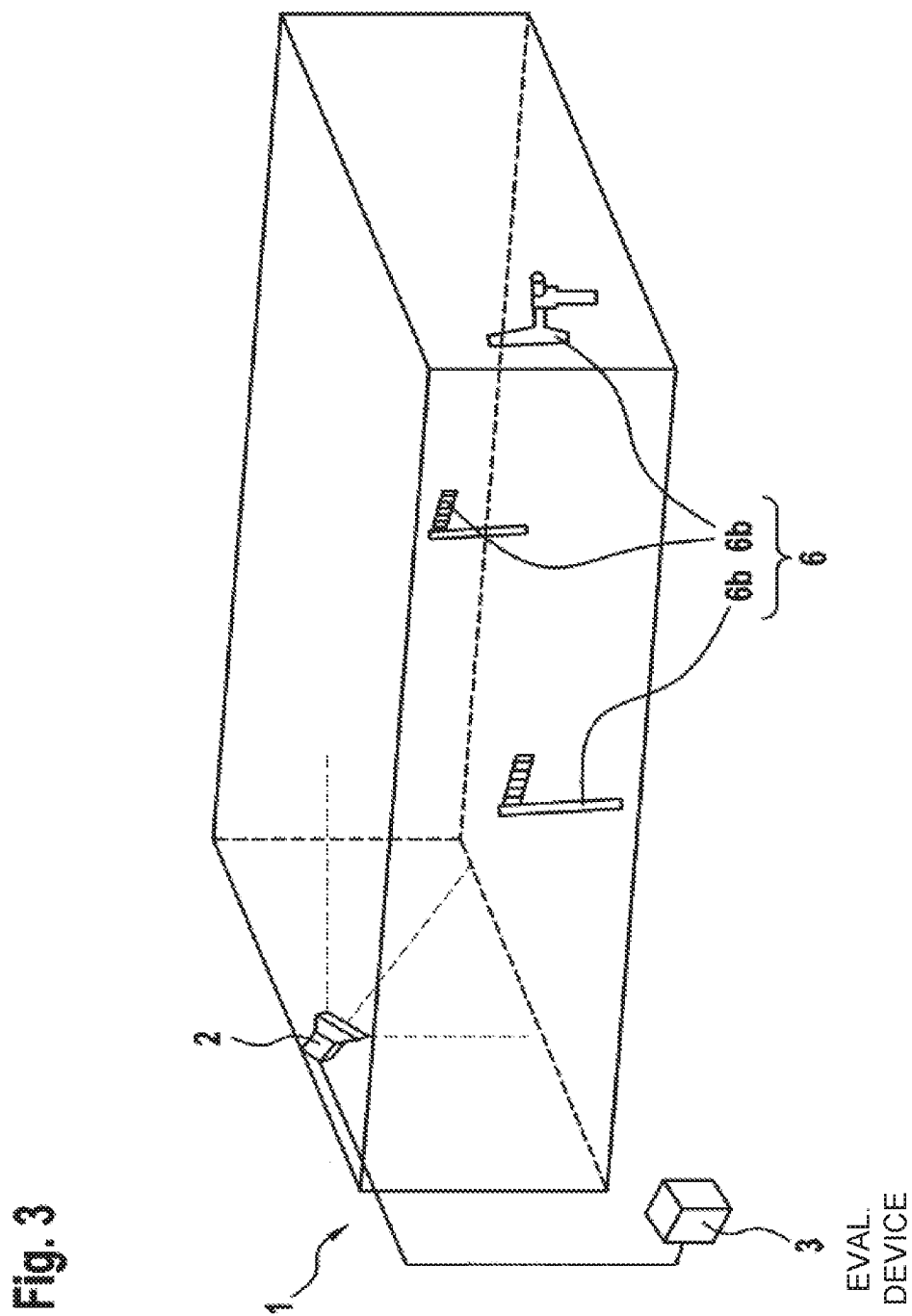
FIG. 3 shows a schematic illustration of the fire detection apparatus from FIG. 1 as a second exemplary embodiment of the invention.

FIG. 3 illustrates a schematic illustration of the fire detection apparatus 1 as a second exemplary embodiment of the invention. The fire detection apparatus 1 comprises the wind detection device 6, the evaluation unit 3 with the image processing unit 4 and the control unit 7. The monitoring camera 2 is connected to the image processing unit 4 by data-technological means for transmitting the image data.

In this exemplary embodiment, the wind detection device 6 comprises three wind indication modules 6b, which are arranged in the environment region. The number and arrangement of the illustrated wind indication modules 6b are exemplary. The wind indication modules 6b serve to indicate the current wind speed and/or wind direction. The wind speed and/or the wind direction are indicated by the current position state of the wind indication modules 6b. In order to ascertain the wind speed and/or the wind direction, the position state of the wind indication modules 6b is captured by the monitoring camera 2 and transmitted to the image processing unit 4. The image processing unit 4 ascertains on the basis of the position state the current wind speed and/or wind direction. For example, the wind speed data and/or wind direction data are transmitted to the control unit 7, wherein the control unit 7 switches the image processing unit 4 to the appropriate mode in dependence on the data.

The wind indication modules 6b are in this case configured as two wind socks 6b and as a wind vane 6b. The wind speed and/or the wind direction can be captured on the basis of the wind socks 6b. For example, an internal angle and/or an external angle between the wind sock 6b and a rod on which the wind sock 6b is mounted is evaluated to ascertain the wind speed. The wind vane 6b can be used to evaluate at least the wind direction by capturing the orientation.

The invention claimed is:

1. A fire detection apparatus (1),
   wherein the fire detection apparatus (1) is connectable to at least one monitoring camera (2) for recording image data of a monitoring region,
   having a wind ascertainment device (6) for capturing one or more wind parameters in the monitoring region,
   having an evaluation device (3),
   wherein the evaluation device (3) comprises a control unit (7), wherein the control unit (7) is configured for evaluation of the wind parameter data on the basis of the wind ascertainment device (6),
   wherein the evaluation device (3) comprises an image processing unit (4),
   characterized in that
   the image processing unit (4) is configured to evaluate at least one fire detection feature from the image data transmitted from the monitoring camera (2),
   wherein the control unit (7) switches the image processing unit (4) to different fire detection operation modes in dependence on the wind parameters.

2. The fire detection apparatus (1) according to claim 1, characterized in that the wind ascertainment device (6)

comprises at least one electrical wind measuring device (6a), wherein the at least one electrical wind measuring device (6a) is connected to the control unit (7) for transmitting the wind parameters.

3. The fire detection apparatus (1) according to claim 1, characterized in that the wind ascertainment device (6) comprises at least one wind indication module (6b), wherein the wind parameters are ascertainable by ascertaining the position state of the wind indication module (6b) using the at least one monitoring camera (2).

4. The fire detection apparatus (1) according to claim 3, characterized in that the at least one wind indication module (6b) is configured as a wind sock.

5. The fire detection apparatus (1) according to claim 1, characterized in that the at least one fire detection feature is the movement direction of a rising smoke cloud (5).

6. Fire detection apparatus (1) according to claim 1, characterized in that the image processing unit (4) is switched to a fire detection active mode as one of the fire detection operation modes.

7. The fire detection apparatus (1) according to claim 6, characterized in that the image processing unit (4) in the fire detection active mode is switched to a calm-wind mode if the wind speed falls below a threshold value.

8. The fire detection apparatus (1) according to claim 7, characterized in that the image processing unit (4) enters a calm-wind mode to perform fire detection when a captured rising smoke cloud (5) is a vertically oriented column.

9. The fire detection apparatus (1) according to claim 6, characterized in that the image processing unit (4) in the fire detection active mode is switched to a wind mode when a laminar wind flow is captured.

10. The fire detection apparatus (1) according to claim 9, characterized in that the image processing unit enters a wind mode to perform fire detection when a captured rising smoke cloud (5) is a column oriented at an angle to vertical.

11. The fire detection apparatus (1) according to claim 6, characterized in that the image processing unit is switched to the fire detection passive mode when a turbulent wind flow is captured.

12. Fire detection apparatus (1) according to claim 1, characterized in that the image processing unit (4) is switched to a fire detection passive mode as one of the fire detection operation modes.

13. The fire detection apparatus (1) according to claim 12, characterized in that the image processing unit (4) in the fire detection active mode is switched to a calm-wind mode if the wind speed falls below a threshold value.

14. The fire detection apparatus (1) according to claim 13, characterized in that the image processing unit (4) enters a calm-wind mode to perform fire detection when a captured rising smoke cloud (5) is a vertically oriented column as the rising smoke cloud (5).

15. The fire detection apparatus (1) according to claim 12, characterized in that the image processing unit (4) in the fire detection active mode is switched to a wind mode when a laminar wind flow is captured.

16. The fire detection apparatus (1) according to claim 15, characterized in that the image processing unit enters a wind mode to perform fire detection when a captured rising smoke cloud (5) is a column oriented at an angle to vertical.

17. The fire detection apparatus (1) according to claim 1, wherein the one or more wind parameters includes a wind speed.

18. The fire detection apparatus (1) according to claim 1, wherein the one or more wind parameters includes a wind direction.

19. A method for evaluating the at least one fire detection feature using a fire detection apparatus (1) according to claim 1, wherein the wind ascertainment device (6) captures the wind speeds and/or the wind directions in the monitoring region, wherein the control unit (7) evaluates the wind speed data and/or wind direction data captured on the basis of the wind ascertainment device (6), wherein the image processing unit (4) evaluates the at least one fire detection feature from the image data transmitted from the monitoring camera (2), wherein the image processing unit (4) detects a fire in the monitoring region, wherein the control unit (7) switches the image processing unit (4) to different fire detection modes in dependence on the wind speed data and/or wind direction data.

20. A non-transitory computer readable medium including a computer program including instructions for carrying out all the steps of the method according to claim 19, when the program is executed on the fire detection apparatus (1).

* * * * *